United States Patent [19]
Saito et al.

[11] Patent Number: 5,287,229
[45] Date of Patent: Feb. 15, 1994

[54] METHOD OF AVOIDING ACCIDENTAL OVERWRITING ON MAGNETIC TAPE

[75] Inventors: Shuichi Saito, Tachikawa; Tatsuo Mori; Kazuhiko Nakagawara, both of Mitaka, all of Japan

[73] Assignee: TEAC Corporation, Tokyo, Japan

[21] Appl. No.: 750,816

[22] Filed: Aug. 27, 1991

[30] Foreign Application Priority Data

Aug. 30, 1990 [JP] Japan .................. 2-229253

[51] Int. Cl.$^5$ ............................. G11B 15/04
[52] U.S. Cl. ........................ 360/60; 360/31; 360/72.1; 360/72.2; 360/74.4; 360/78.02; 360/74.1
[58] Field of Search ........... 360/31, 60, 69, 72.1, 360/72.2, 74.1, 74.4, 78.02

[56] References Cited

U.S. PATENT DOCUMENTS 4,422,111 12/1983 Moeller et al. .............. 360/72.1

FOREIGN PATENT DOCUMENTS 0016609 2/1978 Japan ....................... 360/31
1165960 8/1967 United Kingdom .......... 360/60

Primary Examiner—Robert J. Pascal
Assistant Examiner—Arnold Kinkead
Attorney, Agent, or Firm—Woodcock Washburn Kurtz Mackiewicz & Norris

[57] ABSTRACT

A method of writing on successive track locations on a magnetic multitrack recording tape so as to avoid accidental overwriting. Preparatory to writing on each track location, the peak amplitude value is derived from the output from a read head scanning prescribed initial part of that track location. The peak value is then compared with a reference value in order to determine whether the tape bears any prewritten information on the track location. Writing on each track location is permitted if the tape has proved to bear no prewritten information thereon, and inhibited if otherwise.

8 Claims, 5 Drawing Sheets

METHOD OF AVOIDING ACCIDENTAL OVERWRITING ON MAGNETIC TAPE

BACKGROUND OF THE INVENTION

Our invention relates to a method of writing on a magnetic recording tape without the danger of accidental overwriting, that is, of accidentally destroying prewritten information on the tape. The writing method of our invention has particular utility in conjunction with digital multitrack recording tapes, although we do not wish our invention to be limited to this specific application.

Digital multitrack recording tapes packaged in cassette or cartridge form have found widespread acceptance as compact, high capacity storages of computer information. Such a tape has a plurality or multiplicity of parallel record tracks extending longitudinally of the tape. U.S. Pat. No. 4,422,111 to Moeller et al. discloses an example of recorder for use with a multitrack tape. The recorder has a record/playback head movable from track to track across the width of the tape. A bidirectional stepper motor is normally employed in combination with a suitable motion translating mechanism for such head travel.

As is well known, the stepper motor rotates in short, discrete steps in response to drive pulses. Each drive pulse determines each discrete angle of rotation of the stepper motor and, in consequence, each step of head travel across the width of the multitrack tape. Therefore, first placed in a transverse reference position proximate one edge of the tape, the head can be stepped to a desired track location on the tape by impressing a required number of drive pulses to the motor. The stepper motor represents one of the most efficient, inexpensive head positioning means.

Occasionally, however, the stepper motor or the motion translating mechanism may malfunction, as all man made machines will, failing to position the head in a desired track location on the tape. Assume that the head is positioned on some wrong track, and that information has already been written on this track. If then information is overwritten on the wrong track, the prewritten information will be destroyed.

The same problem can occur not only in recording computer information but also audio signals. Both the tape cassette for the storage of computer information and the digital audio tape cassette are conventionally provided with a file protect tab on the cassette housing. A removal of this tab makes it impossible to record on the tape. However, the user will not break off the file protect tab if he intends the cassette for additional recording. The file protect tab is therefore not reliable in this case for the protection of prerecorded information.

SUMMARY OF THE INVENTION

We have hereby invented how to write on a magnetic recording tape without the possibility of destroying prewritten information.

Stated broadly, our invention may be summarized as a method of writing on a magnetic recording tape so as to avoid accidental overwriting. The method comprises reading from prescribed part of a recording tape by read/write head means preparatory to writing thereon. Whether the tape bears prewritten data or not is determined on the basis of the output from the read/write head means reading the prescribed part of the tape. Writing on the tape is permitted if the tape has proved to bear no prewritten data, and inhibited if otherwise.

The method of our invention is of particular utility in writing on successive track locations on a multitrack recording tape. The steps of the above summarized writing method may then be repeated preparatory to writing on each track location. No prewritten data will be detected by the preliminary reading from the prescribed part of each track location if the read/write head means is properly positioned thereon, so that data may be subsequently written on the track location without the danger of destroying any prewritten data. Prewritten data will be detected if the read/write head means is misplaced on some existing track. Since writing is then inhibited, the data stored on this existing track will not be destroyed.

For the determination of whether the tape bears prewritten data on each track location, we suggest that the peak amplitude value be derived from the output from the read/write head means reading the prescribed part of each track location. The tape bears prewritten data on that track location if the peak value is not less than a reference value, and does not if the peak value is less than the reference value. The writing method employing this determination scheme is thoroughly practicable with a digital multitrack tape drive employing a digital microprocessor controller, as will be subsequently disclosed in detail.

The above and other features and advantages of our invention and the manner of realizing them will become more apparent, and the invention itself will best be understood, from a study of the following description and appended claims, with reference had to the attached drawings showing some preferred modes of carrying out our invention.

DETAILED DESCRIPTION OF THE INVENTION

Figure 1:
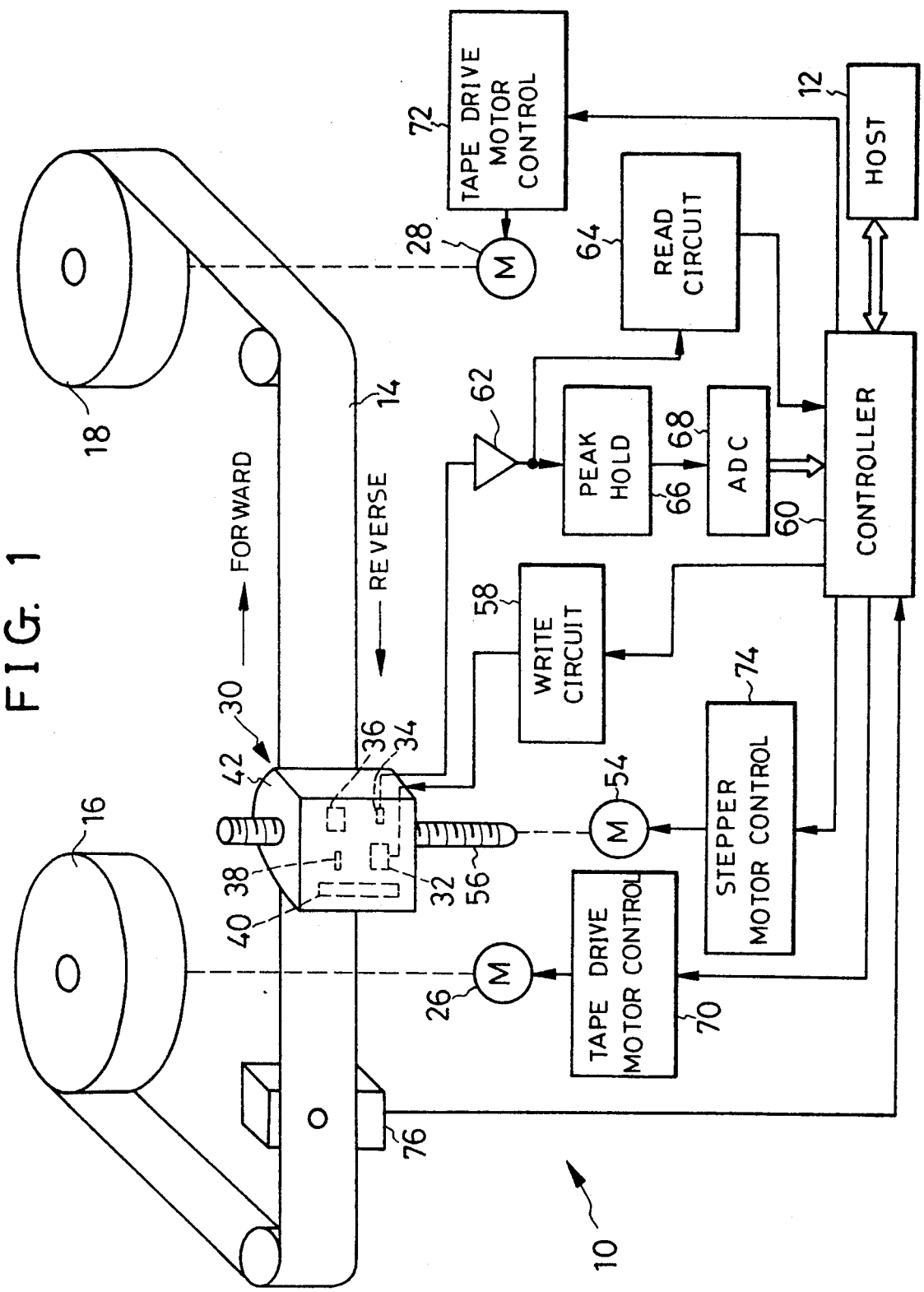
FIG. 1 is a combined pictorial and block diagram of a digital multitrack tape drive constructed for carrying out the method of our invention.

We will now describe the writing method of our invention in detail in the environment of a digital multitrack magnetic tape drive or subsystem operating under the direction of a host system. FIG. 1 shows the tape subsystem 10 together with the host system 12. The tape subsystem 10 is shown together with a digital multitrack magnetic recording tape 14 replaceably loaded therein and extending along a predefined transport path. We understand that the tape 14 is conventionally packaged in cassette form. Thus the tape 14 extends between a pair of reels 16 and 18 rotatably mounted within a boxlike cassette housing which is not shown because of its lack of direct pertinence to our invention.

Figure 2:
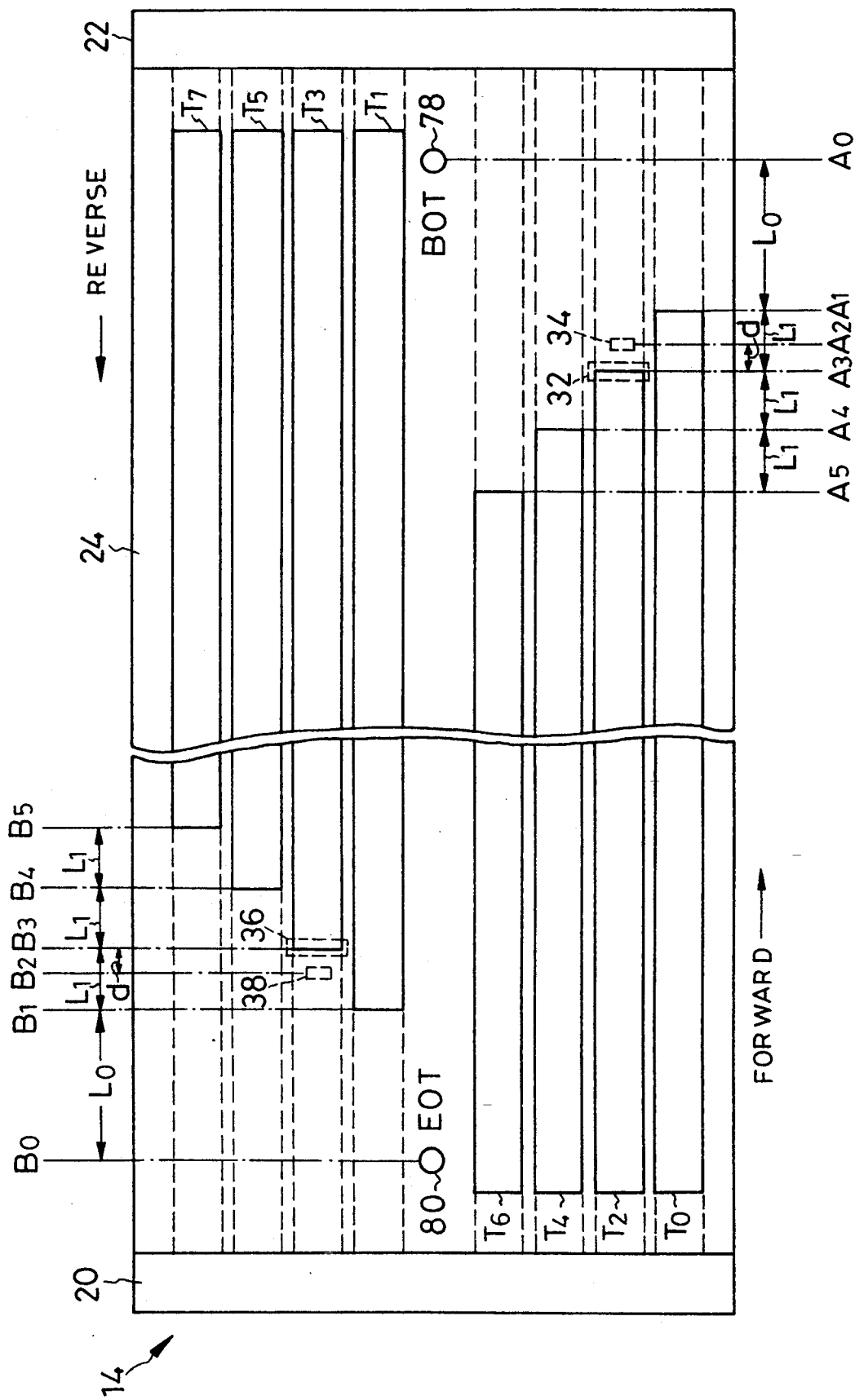
FIG. 2 is a diagrammatic illustration of the tape used in the FIG. 1 tape drive, showing in particular how data is written on the successive track locations on the tape by the method of our invention.

As illustrated on a greatly enlarged scale in FIG. 2, the recording tape 14 has a pair of transparent end sections 20 and 22 of relatively short extent and an opaque data storage section 24 extending therebetween and having a magnetic recording surface. FIG. 2 also shows parallel record tracks extending longitudinally on the data storage section 24 of the tape 14. Typically, as many as seventeen such tracks may be formed on the tape 14, but we have shown only eight tracks, designated $T_0$–$T_7$, as we believe that they suffice for the full disclosure of our invention. We will later refer to FIG. 2 in more detail for the discussion of the writing method according to our invention.

With reference back to FIG. 1 the tape subsystem 10 has a pair of tape drive motors 26 and 28 capable of direct driving engagement with the tape reels 16 and 18, respectively. The tape 14 is to be driven back and forth by these motors 26 and 28. We assume that the tape 14 travels forwardly from reel 16 to reel 18, and reversely from reel 18 to reel 16, as indicated by the arrows in FIG. 1. We will therefore refer to the motor 26 as the reverse tape drive motor, and to the motor 28 as the forward tape dive motor, wherever such distinction has to be made between the two tape drive motors.

At 30 is seen a magnetic read/write head assembly disposed along the transport path of the tape 14. As illustrated more clearly in FIG. 3, the head assembly 30 comprises a forward write head 32, a forward read head 34, a reverse write head 36, a reverse read head 38, and an erase head 40, all mounted to a head carriage or mount 42. It will be seen that the forward write head 32 and the forward read head 34 are aligned longitudinally of the tape 14 extending along the transport path, and so are the reverse write head 36 and the reverse read head 38. An inspection of FIGS. 1 and 3 will also reveal that the forward write head 32 is disposed upstream of the forward read head 34 with respect to the forward traveling direction of the tape 14. Similarly, the reverse write head 36 is disposed upstream of the reverse read head 38 with respect to the reverse traveling direction of the tape 14. The erase head 40 is disposed upstream of all the other heads 32–38 with respect to the forward traveling direction of the tape 14.

Figure 3:
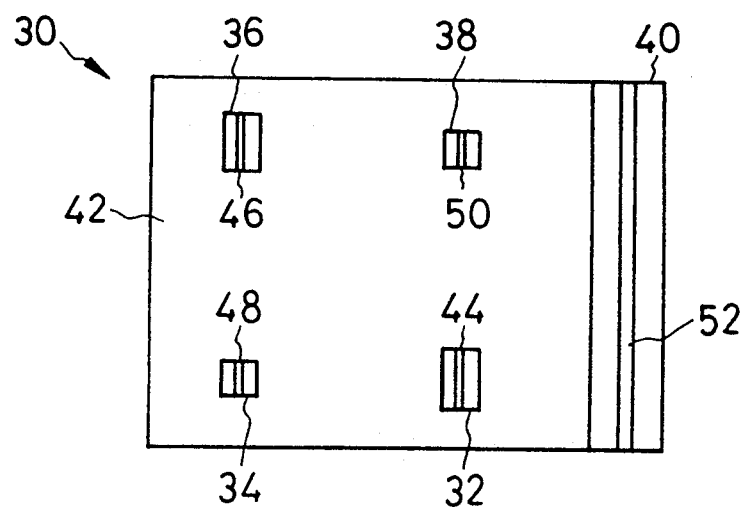
FIG. 3 is an enlarged elevation of the read/write head assembly of the FIG. 1 tape drive.

FIG. 3 further indicates that the write heads 32 and 36 have write gaps 44 and 46, respectively, each extending across the width of the tape 14 to an extent equal to the width of each of the tracks $T_0$–$T_7$ thereon. The read heads 34 and 38 have read gaps 48 and 50, respectively, each extending across the width of the tape to an extent less than each track width and wholly contained within each track formed by the associated write head 32 or 36. The erase head 40 has an erase gap 52 extending across the width of the tape to an extent greater than the complete tape width.

In order to move the read/write head assembly 30 across the width of the tape 14 and to position the head assembly on any track location on the tape, we have employed a bidirectional stepper motor 54, FIG. 1, in combination with a lead screw 56. This lead screw rotatably extends through, and is threadedly engaged with, the mount 42 of the read/write head assembly 30. Therefore, by bidirectionally driving the lead screw 56 with the stepper motor 54, the head assembly 30 can be stepped from one track location to another on the tape 14.

The write heads 32 and 36 of the head assembly 30 are connected via a switching circuit, not shown, to a write circuit 58. This write circuit is connected in turn to a digital microprocessor controller 60, which is conventionally interfaced with the external host system 12. Receiving data to be written (hereinafter referred to as the write data) from the host system 12, the controller 60 delivers the write data to the write circuit 58. The write data is translated into an equivalent electric current by the write circuit 58, for delivery to the write heads 32 and 36.

The read heads 34 and 38 of the head assembly 30 are connected via another switching circuit, also not shown, to an amplifier 62 and thence to a read circuit 64, which in turn is connected to the controller 60. Thus the electric currents produced by the read heads 34 and 38 on reading the data on the tape 14 are first amplified and then translated by the read circuit 64 into well defined pulses representative of the read data. The read data is subsequently delivered to the host system 12 via the controller 60.

The amplifier 62 is also connected to a peak hold circuit 66. We have employed the peak hold circuit 66 for the determination of whether the tape 14 bears any prewritten data on each track location, preparatory to writing on that track location, according to the method of our invention. The peak hold circuit 66 can per se be of conventional design capable of holding the peak amplitude value of the amplified output from the read head 34 or 38 during a given time interval. Connected to the peak hold circuit 66, an analog to digital converter (ADC) 68 translates the peak value into eight bit digital data for delivery to the digital controller 60.

We understand that the controller 60 includes means for comparing the digitized peak value with a reference value which is somewhat higher than the normal noise level. As a result of such comparison the controller 60 determines that the read head 34 or 38 is reading prewritten data if the input peak value is not less than the reference value, and that the read head 34 or 38 is not reading prewritten data if the input peak value is less than the reference value.

The controller 60 is further conventionally connected to two tape drive motor controls 70 and 72, which cause the tape drive motors 26 and 28 to bidirectionally drive the tape 14. Also, the controller 60 is connected to a stepper motor control 74, causing the same to provide drive pulses to the stepper motor 54 and thereby to step the head assembly 30 across the tape 14. Additionally, the controller 60 is connected to an optical sensor 76 for inputting therefrom a signal indicative of a beginning of tape (BOT) marker and an end of tape (EOT) marker on the tape 14. FIG. 2 shows that the BOT marker and the EOT marker are both in the form of holes formed at 78 and 80 in the tape 14 proximate its opposite extremities. The sensor 78 optically detects the BOT hole 78 and EOT hole 80.

OPERATION

The following description of operation of the tape subsystem 10 is tantamount to the discussion of how the illustrated eight record tracks $T_0$–$T_7$ are created sequentially on the tape 14 by the method of our invention. For the creation of Track Zero $T_0$ on the tape, the read/write head assembly 30 may be stepped by the stepper motor 54 so as to position the forward write head 32 and forward read head 34 on that track location. Then, after being wholly rewound on the reel 16 by the reverse tape drive motor 26, the tape 14 may be driven forwardly by the forward tape drive motor 28. When the sensor 76 subsequently detects the BOT hole 78, the counter, not shown, built into the controller 60 will be thereby triggered into operation, counting a preassigned length of time thereafter.

Incidentally, the tape 14 at this time may, or may not, have data prewritten thereon. The writing of data on Track Zero takes place concurrently with the erasure of the complete tape width by the erase head 40 in accordance with standard practice in the art. Therefore, even if the tape bears any prewritten data, all such old data will be thoroughly erased as the tape travels forwardly for having new data written on Track Zero.

The controller 60 will start the delivery of write data to the write circuit 58 upon lapse of the noted preassigned time following the detection of the BOT hole 78 by the sensor 76. Thus the forward write head 32 will start writing data on Track Zero $T_0$, as indicated by the hatching in FIG. 2, at a point $A_1$ spaced a distance $L_0$ from the BOT hole position $A_0$. It will be noted that the distance $L_0$ between the points $A_0$ and $A_1$ is equal to the distance traversed by the tape 14 during the preassigned time measured by the unshown counter built into the controller 60.

Writing on Track Zero $T_0$ may be discontinued after writing the last data block thereon following the detection of the EOT hole 80 by the sensor 76. Then the tape 14 may be wholly wound up on the reel 18 by energizing the forward tape drive motor 28.

Then the stepper motor 54 may be driven to step the read/write head assembly 30 to such a position on the tape 14 that Track One $T_1$ is to be created by the reverse write head 36. Then the reverse tape drive motor 26 may be energized for driving the tape 14 reversely. Here again the controller 60 will measure the noted preassigned time following the detection of the EOT hole 80 by the sensor 76, commencing the delivery of write data to the write circuit 58 upon lapse of that time. Thus the reverse write head 36 will start writing on the location of Track One $T_1$ at a point $B_1$ spaced a distance $L_0$ from the EOT hole position $B_0$.

Notwithstanding the showing of FIG. 2, however, it must be pointed out that the distance $L_0$ between the EOT hole position $B_0$ and the starting point $B_1$ of Track One $T_1$ is not equal to the distance $L_0$ between the BOT hole position $A_0$ and the starting point $A_1$ of Track Zero $T_0$. This inequality is due to the fact that the read/write head assembly 30 and the sensor 76 are displaced from each other in the longitudinal direction of the tape 14 extending along the transport path. We have nevertheless designated the two unequal distances by the same indicia $L_0$ because the creation of Tracks One and Two is started upon lapse of the same length of time following the detection of the BOT hole 78 and EOT hole 80; that is, the two distances are the same in terms of time as measured by the controller 60.

Writing on Track One $T_1$ will be completed when the last data block is written thereon following the detection of the BOT hole 78. Then the tape 14 may be wholly wound up on the reel 16.

Then the stepper motor 54 may be driven again to step the read/write head assembly 30 to such a position on the tape 14 that Track Two $T_2$ is to be created by the forward write head 32. Then the forward tape drive motor 28 may be energized for driving the tape 14 forwardly. The controller 60 will begin to measure time when the sensor 76 detects the BOT hole 78. Then, ascertaining the fact that the forward read head 34 has arrived at the point $A_1$ spaced the distance $L_0$ from the BOT hole position $A_0$, the controller 60 will input the digitized peak value of the output from the forward read head 34. The controller 60 will compare the peak value with a reference value for the determination of whether the forward read head 34 is reading prewritten data on the Track Two location.

We have assumed that any prewritten information on the tape 14 has been thoroughly erased preparatory to writing on the location of Track Zero $T_0$. The peak value of the output from the forward read head 34 will therefore be less than the reference value if the forward write head 32 and forward read head 34 are properly positioned on the Track Two location on the tape 14. Accordingly, when the forward read head 34 arrives at a point $A_2$ spaced a predetermined distance upstream from the point $A_1$ with respect to the forward traveling direction of the tape 14, the forward write head 32 will start writing data on the location of Track Two $T_2$ at a point $A_3$ further spaced upstream from the point $A_2$.

Thus the starting point $A_3$ of Track Two $T_2$ is spaced a distance $L_1$ upstream from the starting point $A_1$ of Track Zero $T_0$. It will also be noted that the distance d between the points $A_2$ and $A_3$ is equal to the center to center distance between forward write head 32 and forward read head 34. The distance between the points $A_1$ and $A_2$, between which the controller 60 determines whether the forward read head 34 is reading prewritten data, is measured by the counter built into the controller 60. Therefore, the distance $L_1$ between $A_1$ and $A_3$ is predetermined. Writing on the Track Two location will be completed in the same way as that on Track Zero $T_0$.

Suppose, on the other hand, that the forward write head 32 and forward read head 34 have been erroneously positioned on Track Zero $T_0$, on which data has already been written as above, instead of on the location of Track Two $T_2$. In that case the peak value of the output from the forward read head 34 will be up to the reference value or more as the forward read head scans the tape from point $A_1$ to point $A_2$. Then, determining that the read/write head assembly 30 has been misplaced on the tape 14, the controller 60 will inhibit writing, signal the host 12 to that effect, and set the forward tape drive motor 28 out of rotation. With overwriting on Track Zero $T_0$ thus inhibited, the prewritten data on that track can be protected from destruction.

Data is to be written on the location of Track Three $T_3$ in essentially the same way as on that of Track Two $T_2$. Namely, after stepping the read/write head assembly 30 to the required position on the tape 14, the reverse tape drive motor 26 may be energized for driving the tape reversely. The controller 60 will start measuring time when the sensor 76 detects the EOT hole 80. Then, at the time the reverse read head 38 arrives at the point $B_1$ spaced the distance $L_0$ from the EOT hole position $B_0$, the controller 60 will start inputting the digitized peak value of the output from the reverse read head 38 for comparison with the reference value. The controller 60 will effect such comparison while the reverse read head 38 is scanning the tape from point $B_1$ to point $B_2$, the latter point $B_2$ being spaced from the former point $B_1$ the same distance as between the points $A_1$ and $A_2$ set forth above in connection with Track Two $T_2$.

Here again the peak value of the reverse read head output will be less than the reference value if the reverse write head 36 and reverse read head 38 are properly positioned on the Track Three location on the tape. Therefore, determining that no data has been prewritten on this track location, the controller 60 will permit the reverse write head 36 to start writing data on the Track Three $T_3$ location at a point $B_3$ when the reverse read head 38 arrives at the point $B_2$. The distance d between the points $B_2$ and $B_3$ is equal to the center to center distance between reverse write head 36 and reverse read head 38 and to that between forward write head 32 and forward read head 34. It is therefore apparent that the starting point $B_3$ of Track Three $T_3$ is spaced the predetermined distance $L_1$ upstream from the starting point $B_1$ of Track One $T_1$ with respect to the reverse traveling direction of the tape 14.

The reverse write head 36 and reverse read head 38 may be erroneously positioned on Track One $T_1$, on which data has already been written as above, instead of on the Track Three location. In that case the peak value of the output from the reverse read head 38 will be not less than the reference value as the reverse read head scans the tape from point $B_1$ to point $B_2$. Then, determining that the read/write head assembly 30 has been misplaced on the tape 14, the controller 16 will proceed to inhibit writing and to set the reverse tape drive motor 26 out of rotation. The prewritten data on Track One $T_1$ will be thus protected from destruction.

For writing data on the location of Track Four $T_4$, the controller 60 will start inputting the digitized peak value of the output from the forward read head 34 when this head comes to the point $A_3$ on the tape 14, that is, to the starting point of Track Two $T_2$. It will be seen that the point $A_3$ is spaced a distance $(L_0+L_1)$ from the BOT hole position $A_0$. The forward write head 32 will start writing on the Track Four $T_4$ location at a point $A_4$, spaced the distance $L_1$ upstream from the point $A_3$ with respect to the forward traveling direction of the tape 14, if the controller 60 determines that no data has been prewritten on this track location.

Thereafter the controller 60 will permit the reverse write head 36 to start writing on the Track Five $T_5$ location at a point $B_4$ spaced the distance $L_1$ upstream from the point $B_3$ with respect to the reverse traveling direction of the tape 14, after making sure that no data has been prewritten thereon. Similarly, Track Six $T_6$ will start at a point $A_5$ spaced the distance $L_1$ upstream from the point $A_4$ with respect to the forward traveling direction of the tape. Track Seven $T_7$ will start at a point $B_5$ spaced the distance $L_1$ upstream from the point $B_4$ with respect to the reverse traveling direction of the tape.

Thus, according to our invention, the controller 60 determines the presence or absence of prewritten data on the even tracks $T_2$, $T_4$ and $T_6$ when the forward read head 34 is scanning the tape 14 between the following two points $P_1$ and $P_2$ thereon:

$P_1 = L_0 + (n/2 - 1)L_1$ $P_2 = L_0 + (n/2 - 1)L_1 + (L_1 - d)$ where n is one of the even track numbers, two, four and six.

The starting points $A_3$, $A_4$ and $A_5$ of the even tracks $T_2$, $T_4$ and $T_6$ can be defined as:

$L_0 + (n/2)L_1$.

For the odd tracks $T_3$, $T_5$ and $T_7$, on the other hand, the controller 60 determines the presence or absence of prewritten data when the reverse read head 38 is scanning the tape 14 between the following two points $P_1'$ and $P_2'$ thereon:

$P_1' = L_0 + [(n'-3)/2]L_1$ $P_2' = L_0 + [(n'-3)/2]L_1 + (L_1 - d)$ where n' is one of the odd track numbers, three, five and seven.

The controller 60 relies on the built in counter for the determination of all such positions.

Since any prewritten information on the tape 14 is assumed to be erased as aforesaid just before writing on Track Zero $T_0$, there is absolutely no danger of accidental overwriting at this time. The detection of possible prewritten data is therefore unnecessary before writing on the Track Zero location. It may also have been noted that no data detection has been made, either, for writing on the Track One $T_1$ location. This is because there is little or no possibility of the reverse write head 36 and reverse read head 38 being erroneously positioned on Track Zero $T_0$, on which data was written just previously, instead of on the Track One location.

We have also assumed in this embodiment of our invention that the tracks $T_0$–$T_7$ are created sequentially in that order. Accordingly, for writing on each new track location, the controller 60 will always specify a track number that is greater than the numbers of the existing tracks. Prewritten data will therefore be infallibly detected if the required pair of write head and read head are misplaced on any existing track. The prewritten data on this existing track will be saved as the controller inhibits overwriting thereon.

Possibly, of course, either pair of write head and read head may be misplaced on a tape position where a greater number track would be formed subsequently if such misplacement did not occur. For example, the forward write head 32 and forward read head 34 may be misplaced on an unwritten future track $T_6$ when it should have been positioned on the location of Track Four $T_4$, with data having been written already on Tracks Zero, One and Three. The Track Four data will then be written on the proper location of Track Six $T_6$, instead of on the proper location of Track Four $T_4$, because no prewritten data will be detected on the proper location of Track Six preparatory to the writing of the Track Four data thereon.

It should be noted, however, that the Track Four data will be written on the proper location of Track Six $T_6$ as if it were being written on the proper location of Track Four $T_4$. That is to say, the forward write head 32 will start writing the Track Four data at the point $A_4$, instead of at the point $A_5$, on the proper location of Track Six $T_6$. The Track Four data thus written on the proper location of Track Six $T_6$ is not to be destroyed when the forward write head 32 and forward read head 34 are subsequently correctly positioned on the proper Track Six location for writing Track Six data thereon. This is because the controller 60 will begin to take in the digitized peak value of the output from the forward read head 34 when this head is at the point $A_4$ on the proper Track Six location, for the detection of any prewritten data preparatory to the writing of the Track Six data. Since the Track Four data on the proper Track Six location starts at the point $A_4$ as aforesaid, this prewritten data will then be detected, resulting in the inhibition of the writing of the Track Six data on the proper Track Six location.

We have thus succeeded in sequentially writing data on successive track locations on the tape without the danger of accidentally destroying any prewritten data. It will also be appreciated that the bidirectional tape travel required for such writing is in no way interrupted for the detection of any prewritten data on each new track location by the method of our invention.

SECOND EXAMPLE

Figure 4:
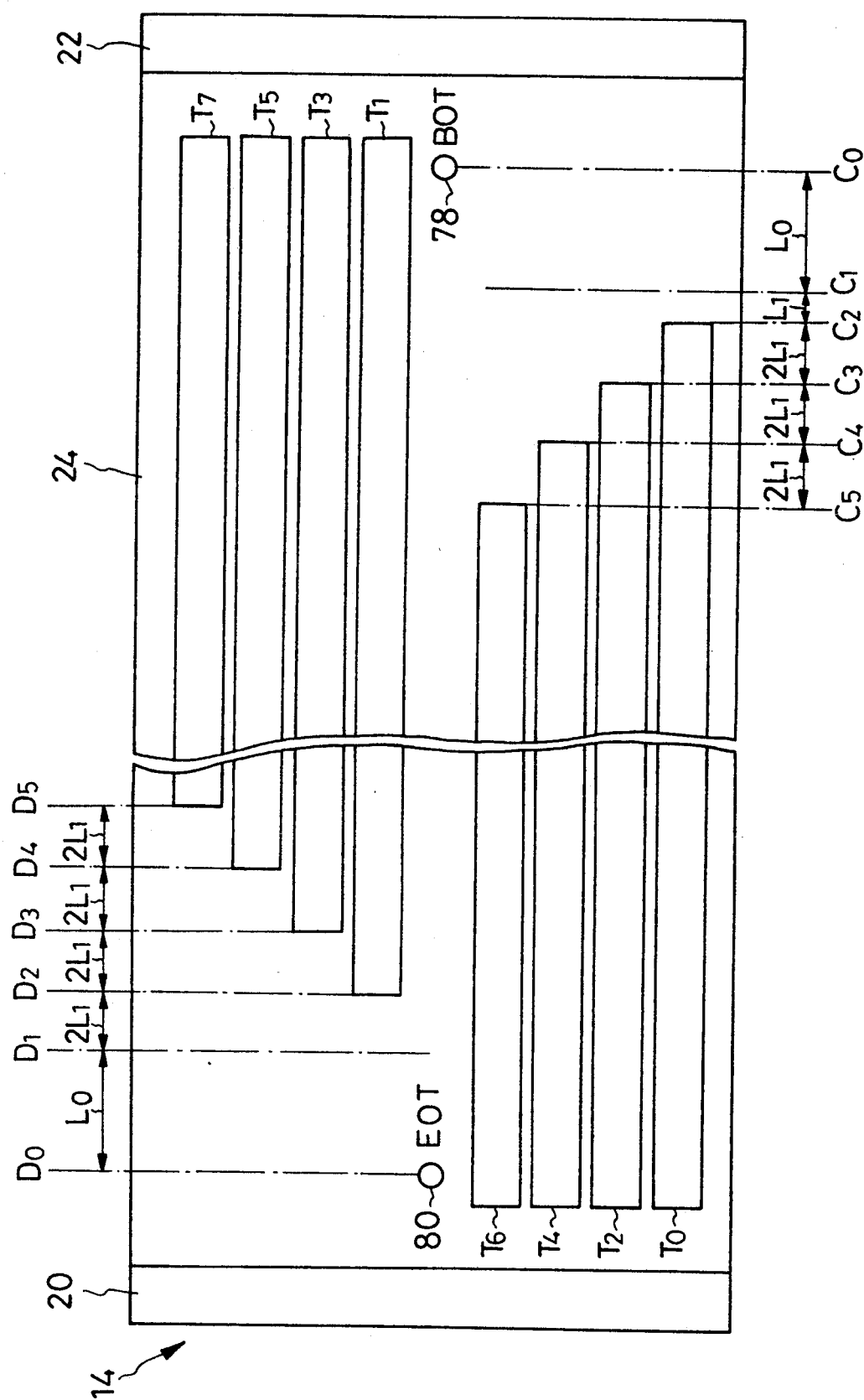
FIG. 4 is an illustration similar to FIG. 2 but explanatory of an alternate writing method according to our invention.

FIG. 4 is explanatory of an alternate method of writing data on successive track locations on the tape according to our invention. This alternate method can also be put to practice using the tape subsystem 10 of FIG. 1, only with a slight modification in the program introduced into the digital microprocessor controller 60.

As will be noted from FIG. 4, the distances between the BOT hole position $C_0$ and the starting points $C_2$, $C_3$, $C_4$ and $C_5$ of the forward record tracks $T_0$, $T_2$, $T_4$ and $T_6$, and between the EOT hole position $D_0$ and the starting points $D_2$, $D_3$, $D_4$ and $D_5$ of the reverse record tracks $T_1$, $T_3$, $T_5$ and $T_7$ are all unlike one another according to this alternate writing method.

Also, according to this alternate writing method, the determination of the presence or absence of prewritten data is made preparatory to writing on all the track locations including those of Track Zero $T_0$ and Track One $T_1$. As a general rule, the determination of whether there is any prewritten data on each new track location is made while the read head 34 or 38 is scanning the tape from a position spaced the distance $L_1$, to a position spaced a distance $(L_1-d)$, downstream from the starting point $C_2$–$C_5$ or $D_2$–$D_5$ of that track with respect to the pertinent traveling direction of the tape.

Thus, before writing on the Track Zero $T_0$ location, the controller 60 will determine the presence or absence of prewritten data on that track location on the basis of the output from the forward read head 34 scanning the tape from the moment when this head is at the point $C_1$ spaced the distance $L_0$ upstream from the BOT hole position $C_0$ with respect to the forward traveling direction of the tape, to the moment when the forward write head 32 is at the point $C_2$ spaced the distance $L_1$ upstream from the point $C_1$. Then, if the tape has proved to bear no prewritten data on the Track Zero location, the controller will cause the forward write head 32 to start writing on this track location at the point $C_2$. Writing on the Track Zero location will of course be inhibited if any prewritten data has been detected.

Then, with the reverse write head 36 and reverse read head 38 subsequently positioned on the Track One $T_1$ location on the tape 14, and with the tape driven reversely, the controller 60 will determine the presence or absence of prewritten data on this track location on the basis of the output from the reverse read head 38 scanning the tape from the moment when the reverse read head is at a point spaced the distance $(L_0+L_1)$ upstream from the EOT hole position $D_0$ with respect tot he reverse traveling direction of the tape, to the moment when the reverse write head 36 is at the point $D_2$ spaced the distance $(L_0+2L_1)$ upstream from the EOT hole position. Then the controller will cause the reverse write head 36 to start writing on the Track One location at the point $D_2$ if no prewritten data has been detected thereon.

Preparatory to writing on the Track Two $T_2$ location, the controller 60 will determine the presence or absence of prewritten data thereon on the basis of the output from the forward read head 34 from the moment when this head is at a point spaced the distance $L_1$ upstream from the point $C_2$ with respect to the forward traveling direction of the tape, to the moment when the forward write head 32 is at the point $C_3$ spaced the distance $2L_1$ upstream from the point $C_2$. Then the controller will cause the forward write head 32 to start writing on the Track Two location at the point $C_3$ if no prewritten data has been detected thereon.

Preparatory to writing on the Track Three $T_3$ location, the controller 60 will determine the presence or absence of prewritten data thereon on the basis of the output from the reverse read head 38 from the moment when this head is at a point spaced the distance $L_1$ upstream from the point $D_2$ with respect tot he reverse traveling direction of the tape, to the moment when the reverse write head 36 is at the point $D_3$ spaced the distance $2L_1$ upstream from the point $D_2$. Then the controller will cause the reverse write head 36 to start writing on the Track Three location at the point $D_3$ if no prewritten data has been detected thereon.

Data will be written, if possible, on the locations of the subsequent tracks $T_4$–$T_7$ in a like manner. Consequently, according to this alternate writing method, the starting points $C_3$, $C_4$ and $C_5$ of the even tracks $T_2$, $T_4$ and $T_6$ are each spaced the distance $2L_1$ upstream from the starting point $C_2$, $C_3$ or $C_4$ of the preceding track with respect to the forward traveling direction of the tape. Likewise, the starting points $D_3$, $D_4$ and $D_5$ of the odd tracks $T_3$, $T_5$ and $T_7$ are each spaced the same distance $2L_1$ upstream from the starting $D_2$, $D_3$ or $D_4$ of the preceding track with respect to the reverse traveling direction of the tape. This alternate writing method is similar in the other details to the first described method of FIG. 2.

THIRD EXAMPLE

Figure 5:
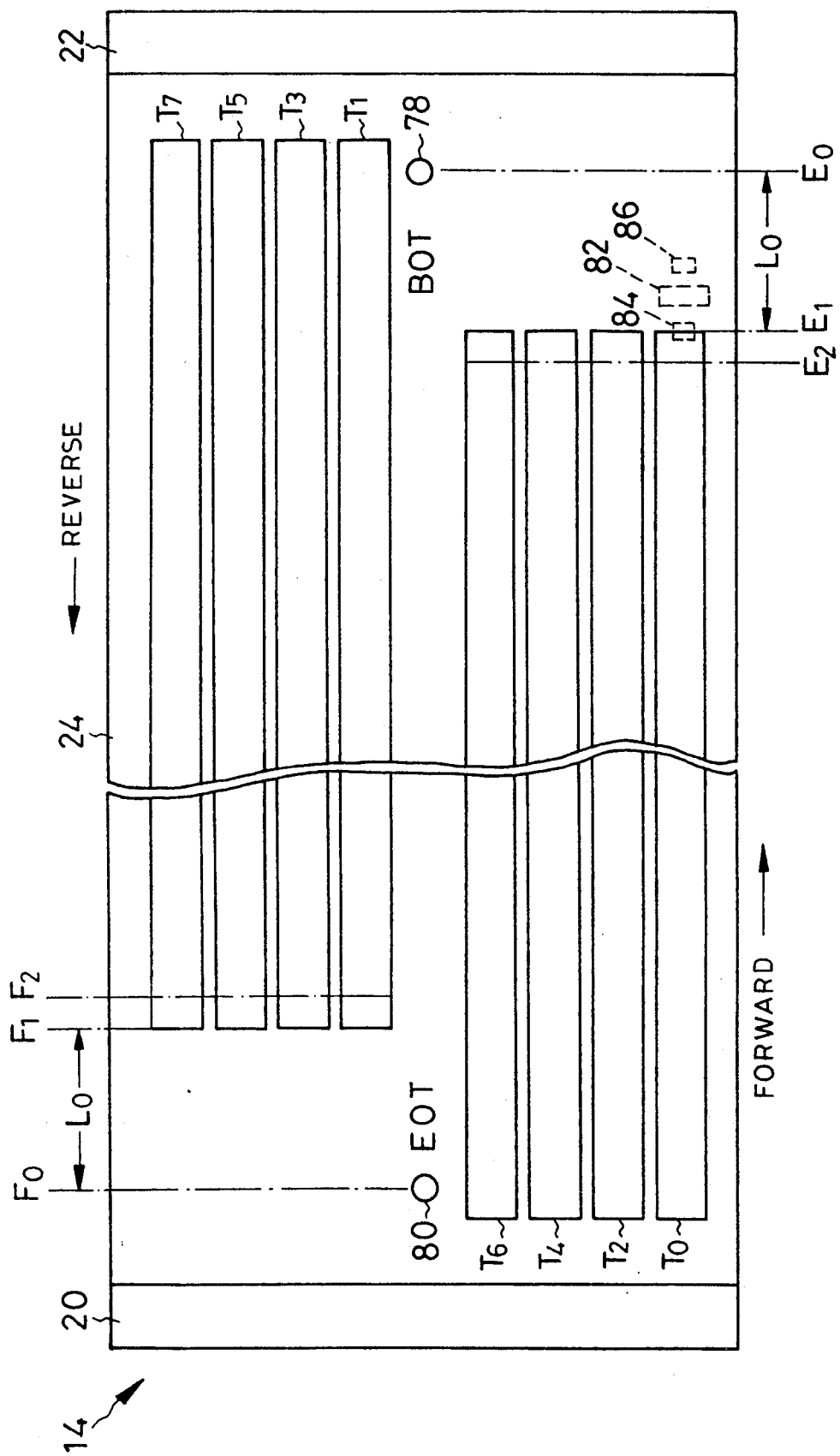
FIG. 5 is also an illustration similar to FIG. 2 but explanatory of another alternate writing method according to our invention.

FIG. 5 is explanatory of another alternate writing method of our invention which also presupposes the use of the tape subsystem 10 of FIG. 1. However, for this second alternate writing method, the magnetic head assembly 30 of the tape subsystem 10 must be modified as shown at 30a in FIG. 6. This figure shows the modified head assembly 30a as seen in the same direction as the head assembly 30 is in FIG. 3.

Figure 6:
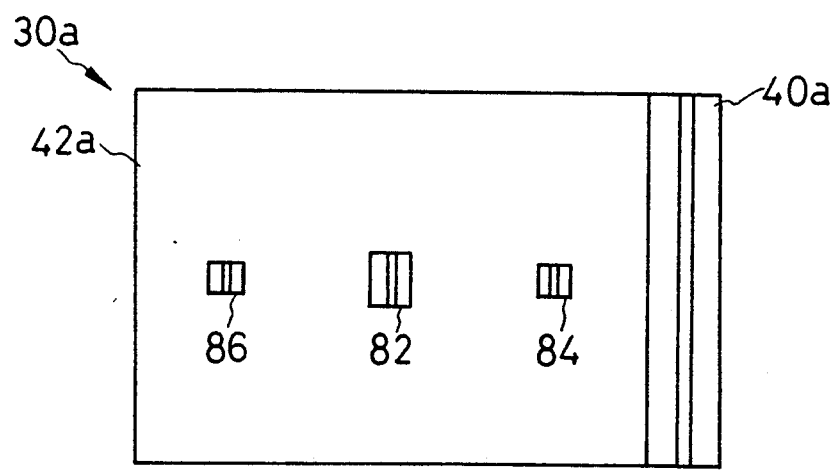
FIG. 6 is a view similar to FIG. 3 but showing a modified read/write head assembly for use with the writing method of FIG. 5.

The modified head assembly 30a of FIG. 6 has but one write head 82, two read heads 84 and 86, and an erase head 40a, all mounted to a head carriage or mount 42a which is driven by the stepper motor 54 of the FIG. 1 tape subsystem 10 via the lead screw 56. The write head 82 and read heads 84 and 86 are aligned longitudinally of the tape 14 extending along the transport path in the tape subsystem 10. The write head 82 is disposed approximately centrally of the head mount 42a, and the two read heads 84 and 86 are disposed upstream and downstream, respectively, of the write head with respect to the forward traveling direction of the tape 14. A predetermined center to center distance is provided between write head 82 and read head 84 and between write head 82 and read head 86. The erase head 40a is similar in location and gap length to the erase head 40 of the FIG. 3 head assembly 30.

FIG. 5 indicates that Track Zero $T_0$ and the even numbered track $T_2$, $T_4$ and $T_6$ all start at the same point $E_1$ spaced the predetermined distance $L_0$ upstream from the BOT hole position $E_0$ with respect to the forward traveling direction of the tape 14. Similarly, the odd numbered tracks $T_1$, $T_3$, $T_5$ and $T_7$ all start at the same point $F_1$ spaced the predetermined distance $L_0$ upstream from the EOT hole position $F_0$ with respect to the reverse traveling direction of the tape 14.

As indicated by the phantom outlines in FIG. 5, the read head 84 of the modified head assembly 30a precedes the write head 82, and the other read head 86 follows the write head 82, when the tape 14 is driven forwardly for writing on the locations of the tracks $T_0$, $T_2$, $T_4$ and $T_6$. The controller 60 will begin to take in the digitized peak value of the output from the leading read head 84 when this head comes to the point $E_1$ upon lapse of the preassigned time, as measured by the counter built into the controller, following the detection of the BOT hole 78 by the sensor 76. The controller 60 will determine whether any data is prewritten on each location of the tracks $T_0$, $T_2$, $T_4$ and $T_6$, while the leading read head 84 is scanning the tape from point $E_1$ to point $E_2$. The write head 82 is at the point $E_1$ when the leading read head 84 comes to the point $E_2$; that is, the distance between $E_1$ and $E_2$ is equal to the center to center distance between the heads 82 and 84. Then, in the absence of any prewritten data, the controller 60 will cause the write head 82 to start writing at the point $E_1$. The trailing read head 86 can be used for finding possible errors in the data that has been written by the write head 82.

It will be apparent, then, that the read head 86 of the head assembly 30a precedes the write head 82, and the other read head 84 follows the write head 82, when the tape 14 is driven reversely for writing on the locations of the odd numbered tracks $T_1$, $T_3$, $T_5$ and $T_7$. The controller 60 will begin to take in the digitized peak value of the output from the leading read head 86 when this head comes to the point $F_1$ upon lapse of the preassigned time following the detection of the EOT hole 80 by the sensor 76. The controller 60 will determine whether any data is prewritten on each location of the odd numbered tracks $T_1$–$T_7$, while the leading read head 86 is scanning the tape from point $F_1$ to point $F_2$. Since the distance between $F_1$ and $F_2$ is equal to the center to center distance between write head 82 and read head 86, the write head will be at the point $F_1$ when the leading read head 86 comes to the point $F_2$. Then the controller 60 will cause the write head 82 to start writing at the point $F_1$ if no prewritten data has been detected. During the subsequent writing on each odd numbered track, too, the trailing read head 84 can be used for finding possible errors in the data that has been written by the write head 82.

Of course, in event any prewritten data is detected while the preceding read head 84 or 86 is scanning the tape from $E_1$ to $E_2$, or from $F_1$ to $F_2$, on any track location, the controller 60 will inhibit writing on that track location and inform the host 12 to that effect. It is therefore apparent that this second alternate writing method gains the same advantages as do the two methods described above.

POSSIBLE MODIFICATIONS

Although we have shown and described the writing method of our invention in terms of some preferred examples thereof and as put to practice using the tape subsystem constructed as shown in FIG. 1, we do not wish our invention to be limited by the exact details of such disclosure. The following, then, is a brief list of possible modifications or alterations of the foregoing examples which we believe all fall within the scope of our invention:

1. The division of the record tracks into even numvered ones $T_0$, $T_2$, $T_4$ and $T_6$, created forwardly on the tape, and odd numbered ones $T_1$, $T_3$, $T_5$ and $T_7$, created reversely, in FIGS. 2, 4 and 5 is not essential; instead, for example, tracks $T_0$, $T_1$, $T_2$ and $T_3$ could be created forwardly, and tracks $T_4$, $T_5$, $T_6$ and $T_7$ reversely.

2. The output from the peak hold circuit 66 could be sent to an analog comparator for comparison with a reference value, and the result of such comparison subsequently sent to the controller 60, instead of being digitized and sent directly to the controller for comparison with a reference value therein.

3. The FIG. 3 head assembly 30, rather than the FIG. 6 head assembly 30a, could be employed for the track arrangement of FIG. 5. In this case, preparatory to writing on each of the forward tracks $T_0$–$T_6$, for example, the tape may be scanned from point $E_1$ to point $E_2$ by the forward read head 34 for the determination of whether there is any prewritten data on each such track location. Then, after rewinding the tape, data may be written from the point $E_1$ by the forward write head 32 if no prewritten data has been found.

What we claim is:

1. A method of writing successively on at least two track locations ($T_0$, $T_2$) on a magnetic recording tape so as to avoid accidental overwriting, the tape having a longitudinal reference position ($A_0$) adjacent one extremity thereof, which method comprises:

(a) providing head means comprising a write head and a read head aligned longitudinally of the tape extending along a predetermined transport path, with the write head disposed upstream of the read head, with a predetermined center to center distance (d) therebetween, with respect to a predetermined traveling direction of the tape along the transport path;

(b) positioning the write head and the read head on a first track location ($T_0$) on the tape;

(c) driving the tape in the predetermined direction along the transport path;

(d) causing the write head to start writing on the first track location at a first point ($A_1$) spaced a predetermined distance ($L_0$) upstream from the longitudinal reference position ($A_0$) with respect to the predetermined traveling direction of the tape;

(e) positioning the write head and the read head on a second track location ($T_2$) on the tape;

(f) again driving the tape in the predetermined direction along the transport path;

(g) determining whether the tape bears prewritten data on the second track location or not, on the basis of an output from the read head scanning the tape from the first point ($A_1$) to a second point ($A_2$) spaced another predetermined distance upstream from the first point with respect to the predetermined traveling direction of the tape;

(h) causing the write head to start writing on the second track location at a third point ($A_3$) spaced the center to center distance (d) between the write head and the read head upstream from the second point ($A_2$) with respect to the predetermined traveling direction of the tape, if the tape has proved to bear no prewritten data on the second track location; and (i) inhibiting writing on the second track location if the tape has proved to bear prewritten data on the second track location.

2. The writing method of claim 1 wherein whether the tape bears prewritten data on the second track location ($T_2$) or not is determined by:
   (a) deriving the peak value of the output from the read head scanning the tape from the first to the second point; and
   (b) comparing the peak value with a reference value.

3. A method of writing successively on a plurality of track locations ($T_0$, $T_1$, $T_2$ and $T_3$) on a magnetic recording tape so as to avoid accidental overwriting, the tape having a first and a second longitudinal reference position ($A_0$, $B_0$) adjacent opposite extremities thereof, which method comprises:
   (a) providing head means comprising a first and a second write head and a first and a second read head, the first write head and the first read head being aligned longitudinally of the tape extending along a predefined transport path, with the first write head disposed upstream of the first read head, with a predetermined center to center distance (d) therebetween, with respect to a predetermined forward traveling direction of the tape along the transport path, the second write head and the second read head being also aligned longitudinally of the tape extending along the transport path, with the second write head disposed upstream of the second read head, with a predetermined center to center distance (d) therebetween, with respect to a predetermined reverse traveling direction of the tape along the transport path;
   (b) positioning the first write head and the first read head on a first track location ($T_0$) on the tape;
   (c) driving the tape in the forward direction along the transport path;
   (d) causing the first write head to start writing on the first track location at a first point ($A_1$) spaced a first predetermined distance ($L_0$) upstream from the first longitudinal reference position ($A_0$) with respect to the forward traveling direction of the tape;
   (e) positioning the second write and the second read head on a second track location ($T_1$) on the tape;
   (f) driving the tape in the reverse direction along the transport path;
   (g) causing the second write head to start writing on the second track location at a second point ($B_1$) spaced the first predetermined distance ($L_0$) upstream from the second longitudinal reference position ($B_0$) with respect to the reverse traveling direction of the tape;
   (h) positioning the first write head and the first read head on a third track location ($T_2$) on the tape;
   (i) driving the tape in the forward direction along the transport path;
   (j) determining whether the tape bears prewritten data on the third track location or not, on the basis of an output from the first read head scanning the tape from the first point ($A_1$) to a third point ($A_2$) spaced a second predetermined distance upstream from the first point with respect to the forward traveling direction of the tape;
   (k) causing the first write head to start writing on the third track location at a fourth point ($A_3$) spaced the center to center distance (d) between the first write head and the first read head upstream from the third point ($A_2$) with respect to the forward traveling direction of the tape, if the tape has proved to bear no prewritten data on the third track location;
   (l) inhibiting writing on the third track location if the tape has proved to bear prewritten data on the third track location;
   (m) positioning the second write head and the second read head on a fourth track location ($T_3$) on the tape;
   (n) driving the tape in the reverse direction along the transport path;
   (o) determining whether the tape bears prewritten data on the fourth track location or not, on the basis of the output from the second read head scanning the tape from the second point ($B_1$) to a fifth point ($B_2$) spaced the second predetermined distance upstream from the second point with respect to the reverse traveling direction of the tape;
   (p) causing the second write head to start writing on the fourth track location at a sixth point ($B_3$) spaced the center to center distance (d) between the second write head and the second read head upstream from the fifth point ($B_2$) with respect to the reverse traveling direction of the tape, if the tape has proved to bear no prewritten data on the fourth track location; and
   (q) inhibiting writing on the fourth track location if the tape has proved to bear prewritten data on the fourth track location.

4. The writing method of claim 3 wherein whether the tape bears prewritten data on the third and fourth track location ($T_2$, $T_3$) or not is determined by:
   (a) deriving the peak values of the outputs from the first and the second read heads scanning the tape from the first point ($A_1$) to the third point ($A_2$), and from the second point ($B_1$) to the fifth point ($B_2$), respectively; and
   (b) comparing the peak values with a reference value.

5. The writing method of claim 1 or 3 wherein the head means further comprises an erase head capable of erasing the complete width of the tape, and wherein the tape is wholly erased by the erase head preparatory to writing on the first track location.

6. A method of writing on at least two track locations ($T_0$, $T_1$) on a magnetic recording tape so as to avoid accidental overwriting, the tape having a first and a second longitudinal reference position ($C_0$, $D_0$) adjacent opposite extremities thereof, which method comprises:
   (a) providing head means comprising a first and a second write head and a first and a second read head, the first write head and the first read head being aligned longitudinally of the tape extending along a predefined transport path, with the first write head disposed upstream of the first read head, with a predetermined center to center distance (d) therebetween, with respect to a predetermined forward traveling direction of the tape extending along the transport path, the second write head and the second read head being also aligned longitudinally of the tape extending along the transport path, with the second write head disposed upstream of the second read head, with a predetermined center to center distance (d) therebetween, with respect to a predetermined reverse traveling direction of the tape along the transport path;
   (b) positioning the first write head and the first read head on a first track location ($T_0$) on the tape;

(c) driving the tape in the forward direction along the transport path;

(d) determining whether the tape bears prewritten data on the first track location or not, on the basis of an output from the first read head scanning the tape from the moment when the first read head is at a first point ($C_1$) on the tape spaced a first predetermined distance ($L_0$) upstream from the first longitudinal reference position ($C_0$) with respect to the forward traveling direction of the tape, to the moment when the first write head is at a second point ($C_2$) on the tape spaced a second predetermined distance ($L_1$) upstream from the first point with respect to the forward traveling direction of the tape;

(e) causing the first write head to start writing on the first track location at the second point ($C_2$) if the tape has proved to bear no prewritten data on the first track location;

(f) inhibiting writing on the first track location if the tape has proved to bear prewritten data on the first track location;

(g) positioning the second write and the second read head on a second track location ($T_1$) on the tape;

(h) driving the tape in the reverse direction along the transport path;

(i) determining whether the tape bears prewritten data on the second track location or not, on the basis of an output from the second read head scanning the tape from the moment when the second read head is at a third point on the tape spaced a third predetermined distance ($L_0+L_1$) upstream from the second longitudinal reference position ($D_0$) with respect to the reverse traveling direction of the tape, to the moment when the second write head is at a fourth point ($D_2$) on the tape spaced the second predetermined distance ($L_1$) upstream from the third point with respect to the reverse traveling direction of the tape;

(j) causing the second write head to start writing on the second track location at the fourth point ($D_2$) if the tape has proved to bear no prewritten data on the second track location; and (k) inhibiting writing on the second track location if the tape has proved to bear prewritten data on the second track location.

7. The writing method of claim 6 which further comprises:

(a) positioning the first write head and the first read head on a third track location ($T_2$) on the tape;

(b) driving the tape in the forward direction along the transport path;

(c) determining whether the tape bears prewritten data on the third track location or not, on the basis of an output from the first read head scanning the tape from the moment when the first read head is at a fifth point on the tape spaced the second predetermined distance ($L_1$) upstream from the second point ($C_2$) with respect to the forward traveling direction of the tape, to the moment when the first write head is at a sixth point ($C_3$) on the tape spaced the second predetermined distance ($L_1$) upstream from the fifth point with respect to the forward traveling direction of the tape;

(d) causing the first write head to start writing on the third track location at the sixth point ($C_3$) if the tape has proved to bear no prewritten data on the third track location;

(e) inhibiting writing on the third track location if the tape has proved to bear prewritten data on the third track location;

(f) positioning the second write and the second read head on a fourth track location ($T_3$) on the tape;

(g) driving the tape in the reverse direction along the transport path;

(h) determining whether the tape bears prewritten data on the fourth track location or not, on the basis of an output from the second read head scanning the tape from the moment when the second read head is at a seventh point on the tape spaced the second predetermined distance ($L_1$) upstream from the fourth point ($D_2$) with respect to the reverse traveling direction of the tape, to the moment when the second write head is at an eighth point ($D_3$) on the tape spaced the second predetermined distance ($L_1$) upstream from the seventh point with respect to the reverse traveling direction of the tape;

(i) causing the second write head to start writing on the fourth track location at the eighth point ($D_3$) if the tape has proved to bear no prewritten data on the fourth track location; and (j) inhibiting writing on the fourth track location if the tape has proved to bear prewritten data on the fourth track location.

8. The writing method of claim 6 wherein whether the tape bears prewritten data on the first and the second track location ($T_0$, $T_1$) or not is determined by:

(a) deriving the peak values of the outputs from the first and the second read heads scanning the tape from the moment when the first read head is at the first point ($C_1$) to the moment when the first write head is at the second point ($C_2$), and from the moment when the second read head is at the third point to the moment when the second write head is at the fourth point ($D_2$), respectively; and (b) comparing the peak values with a reference value.

* * * * *